United States Patent [19]

Jones

[11] Patent Number: 5,463,482
[45] Date of Patent: Oct. 31, 1995

[54] LIQUID CRYSTAL COMPOSITE WITH DROPLETS OF PLURAL CHIRAL NEMATIC MATERIALS WITH DIFFERENT REFLECTION BANDS

[75] Inventor: Philip J. Jones, Menlo Park, Calif.

[73] Assignee: Raychem Corporation, Menlo Park, Calif.

[21] Appl. No.: 139,382

[22] Filed: Oct. 18, 1993

[51] Int. Cl.⁶ ........................................ G02F 1/13
[52] U.S. Cl. ........................................ 359/51
[58] Field of Search ........................................ 359/51, 52

[56] References Cited

U.S. PATENT DOCUMENTS

| | | | |
|---|---|---|---|
| 3,551,026 | 12/1970 | Heilmeier et al. | 350/150 |
| 3,578,844 | 5/1971 | Chruchill et al. | 350/160 |
| 3,585,381 | 6/1971 | Hodson et al. | 250/47 |
| 3,600,060 | 8/1971 | Churchill et al. | 350/160 |
| 3,600,064 | 8/1971 | Walz | 350/236 |
| 3,620,889 | 11/1971 | Baltzer | 161/5 |
| 3,627,408 | 12/1971 | Fergason | 353/84 |
| 3,650,603 | 3/1972 | Heilmeier et al. | 360/160 |
| 3,697,297 | 10/1972 | Chruchill et al. | 106/131 |
| 3,703,331 | 11/1972 | Goldmacher et al. | 350/160 |
| 3,720,623 | 3/1973 | Cartmell et al. | 252/316 |
| 3,734,597 | 5/1973 | Chruchill et al. | 350/160 |
| 3,852,092 | 12/1974 | Patterson et al. | 117/36.7 |
| 3,872,050 | 3/1975 | Benton et al. | 260/37 |
| 3,935,337 | 1/1976 | Taylor | 427/180 |
| 4,087,575 | 5/1978 | Bichara | 428/1 |
| 4,101,207 | 7/1978 | Taylor | 350/344 |
| 4,161,557 | 7/1979 | Suzuki et al. | 428/1 |
| 4,182,700 | 1/1980 | Benton et al. | 260/37 |
| 4,246,302 | 1/1981 | Benton et al. | 428/1 |
| 4,310,557 | 1/1982 | Davison et al. | 428/1 |
| 4,433,637 | 2/1984 | Buirley et al. | 116/207 |
| 4,501,503 | 2/1985 | Buirley et al. | 374/162 |
| 4,581,608 | 4/1986 | Aftergut et al. | 359/51 |
| 4,596,446 | 6/1986 | Waters et al. | 350/346 |
| 4,688,901 | 8/1987 | Albert | 350/350 S |
| 5,018,840 | 5/1991 | Ogawa | 350/349 |
| 5,021,188 | 6/1991 | Vaz et al. | 252/299.5 |
| 5,168,380 | 12/1992 | Fergason | 359/51 |
| 5,200,845 | 4/1993 | Crooker et al. | 359/51 |
| 5,223,959 | 6/1993 | Wu et al. | 359/51 |
| 5,301,046 | 4/1994 | Konuma et al. | 359/51 |
| 5,333,072 | 7/1994 | Willett | 359/41 |

FOREIGN PATENT DOCUMENTS

| | | | |
|---|---|---|---|
| 0268877A2 | 6/1988 | European Pat. Off. | G02F 1/133 |
| 0559378A1 | 9/1993 | European Pat. Off. | G02F 1/1333 |
| 4007039 | 10/1990 | Germany . | |
| 60-191203 | 9/1985 | Japan | 359/51 |
| WO89/02093 | 3/1989 | WIPO | G02F 1/13 |
| WO93/23496 | 11/1991 | WIPO | C09K 19/52 |

OTHER PUBLICATIONS

West et al., *Appl. Phys. Lett.* vol. 63, No. 11, pp. 1471–1473 (1993).
Crooker et al., "A color display using polymer dispersed chiral liquid crystals," SID 90 Digest, pp. 214–216 (1990).
Crooker et al., "Polymer–dispersed chiral liquid crystal color display," *Appl. Phys. Lett.* vol. 57, No. 24, pp. 2529–2531 (1990).
Doane et al., "Front–lit flat panel display from polymer stabilized cholesteric textures" Proceed. 12th Int'Display Research Conf. Hiroshima Japan, pp. 73–76 (Oct. 1992).

*Primary Examiner*—Anita Pellman Gross
*Assistant Examiner*—Charles Miller
*Attorney, Agent, or Firm*—Herbert G. Burkard; Yuan Chao

[57] ABSTRACT

A chiral nematic liquid crystal-polymer composite capable of having a paper-white off-state and a highly transparent on-state. The composite includes droplets of at least two different liquid crystal materials. The different liquid crystal materials are isolated from each other and have different reflection bands. The composite is suitable for use in light valves generally and direct view and projection displays particularly.

20 Claims, 3 Drawing Sheets

1

LIQUID CRYSTAL COMPOSITE WITH DROPLETS OF PLURAL CHIRAL NEMATIC MATERIALS WITH DIFFERENT REFLECTION BANDS

TECHNICAL FIELD OF THE INVENTION

This invention relates to a liquid crystal-polymer composite suitable for use in light valves, and devices made therefrom.

BACKGROUND OF THE INVENTION

Liquid crystal displays are known in the art. Generally, they provide a convenient method for presenting different visual states by controlling whether light is transmitted or not through a liquid crystal material. However, often their optical performance is middling.

In one type of liquid crystal displays, the twisted nematics (or TN's), a polarizer which absorbs one half of the incident light must be present. The result is a display which is not very bright, with black pixels against a silvery grey background, and which may be difficult to read in when ambient lighting conditions are poor.

Liquid crystal displays which rely on the altering the light absorption properties of a dichroic dye dissolved in the liquid crystal are also known. However, even in the state in which the dye is nominally non-absorbing, there is significant residual absorption, making it difficult to exceed 50% brightness and retain a high contrast ratio.

Another class of liquid crystal displays relies on the scattering properties of a liquid crystal material dispersed in a polymeric matrix. However, most of the light scattered is forwardly scattered. When used in a direct viewing mode, this is disadvantageous because little incident light is redirected back towards the viewer. When used in the transmissive mode, this is disadvantageous because the forwardly scattered light decreases contrast.

SUMMARY OF THE INVENTION

Thus, an object of this invention is a liquid crystal display which can present a strongly white (paper-white) first visual state and a second visual state which is strongly transmissive (or can be made to appear very dark by absorption of the light transmitted), which therefore appears bright and high-contrast to a viewer.

Accordingly, this invention provides a liquid crystal-polymer composite, comprising a matrix polymer;

plural volumes of a first liquid crystal material dispersed in the matrix polymer, which first liquid crystal material is chiral nematic and positively dielectrically anisotropic and has a characteristic reflection band; and plural volumes of at least one additional liquid crystal material also dispersed in the matrix polymer, which at least one additional liquid crystal material also is chiral nematic and positively dielectrically anisotropic but has a characteristic reflection band different from the characteristic reflection band of the first liquid crystal material;

which composite at least one of reflects and scatters incident light in the absence of a sufficient electric field and is substantially transparent to incident light in the presence of a sufficient electric field.

In second embodiment of the invention there is provided a liquid crystal light valve, comprising (a) spaced-apart first and second transparent electrodes and (b) a liquid crystal-polymer composite as described above disposed between the first and second electrodes.

In a third embodiment of the invention, there is provided a projector, comprising (a) a light source for producing light, (b) a lens for projecting the light onto a screen and (c) liquid crystal-polymer composite as described above disposed between the light source and the lens for controlling which portions of the light reach the lens.

In a fourth embodiment of the invention, there is provided a display comprising (a) a light absorber and (b) liquid crystal-polymer composite as described above, disposed on the viewing side of the display and between the light absorber and the light incident on the display from the viewing side, which composite controls whether such incident light reaches the light absorber and is absorbed thereby or is at least one of reflected or scattered back towards the viewing side.

In a preferred embodiment, the ordinary indices of refraction $n_o$ of the first and the at least one additional liquid crystal materials are substantially the same as the index of refraction $n_p$ of the matrix polymer.

In another preferred embodiment, the combined reflection bands of the first and the at least one additional liquid crystal materials cause the liquid crystal-polymer composite to have a combined reflection band between 400 and 700 nm.

In yet another preferred embodiment, the plural volumes of the first and the at least one additional liquid crystal material each comprise volumes of liquid crystal material of right-handed chirality and volumes of liquid crystal material of left-handed chirality.

BRIEF DESCRIPTION OF THE DRAWING(S)

DESCRIPTION OF THE PREFERRED EMBODIMENTS

Figure 1A:
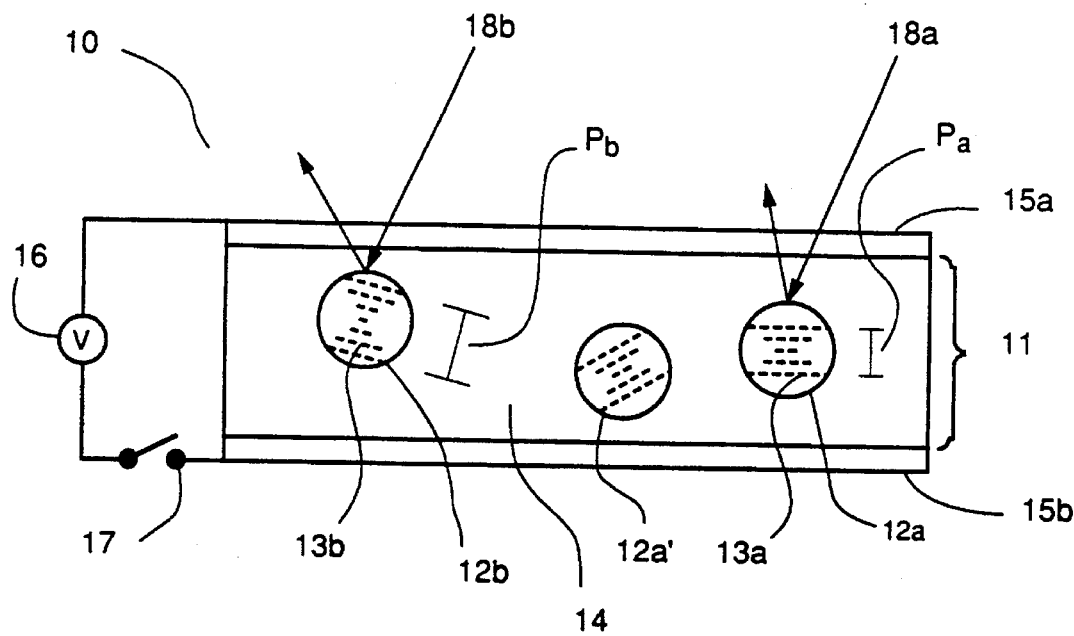
FIGS. 1a and 1b show respectively the unpowered and powered states of a light valve of this invention.

A light valve 10 of this invention is shown schematically in FIG. 1a. It comprises a liquid crystal-polymer composite 11 sandwiched between first and second transparent electrodes 15a and 15b. Composite 11 contains droplets 12a of liquid crystal material 13a dispersed within a matrix polymer 14. Liquid crystal material 13a is chiral nematic and optically and dielectrically anisotropic. Because of the optical anisotropy (also called birefringence), liquid crystal material 13a has two indices of refraction, an extraordinary index of refraction ($n_e$) and an ordinary index of refraction ($n_o$). The dielectric anisotropy is positive, meaning that the liquid crystal molecules tend to align with their long molecular axes parallel to an applied electric field. Within each droplet 12a, liquid crystal material 13a is arranged in the helical planes unique to the chiral nematic mesophase, with a characteristic helical pitch $P_a$. The orientation of the helical axes from droplet to droplet is random, as symbolized by the different orientations of shown for droplets 12a and 12a'. Composite 11 further contains droplets 12b of another liquid crystal material 13b, dispersed in matrix polymer 14. Liquid crystal material 13b is chiral nematic, birefringent, and positively dielectrically anisotropic, like liquid crystal material 13a, but has a different characteristic helical pitch $P_b$. The helical axes among different droplets 12b are also randomly oriented. Droplets 12a and 12b are roughly evenly interspersed among each other. Electrodes 15a and 15b are made of a transparent conductor such as indium tin oxide (ITO) and are connected to a power source 16.

When switch 17 which controls the circuit is in its open position as shown in FIG. 1a (the "off-state"), no voltage is impressed across composite 11 and the electric field experienced by liquid crystal materials 13a and 13b is effectively zero. Incident light denoted by rays 18a and 18b is reflected backwards by the planar texture of liquid crystal materials 13a and 13b. For a given chiral nematic liquid crystal material, not all incident light is reflected. Only light having a wavelength $\lambda$ within a characteristic reflection band of width $\Delta\lambda$ which is dependent upon the helical pitch is reflected. Thus, liquid crystal material 13a will reflect incident light within a first band determined by its characteristic helical pitch $P_a$, while liquid crystal material 13b will reflect light within a second band determined by its characteristic helical pitch $P_b$. By appropriate selection of liquid crystal materials, one may obtain a composite 11 having a combined reflection band having a bandwidth that corresponds to white light—that is, covering the entire visible spectrum (400 to 700 nm)—so that composite 11 appears paper-white. Those skilled in the art will appreciate that, if desirable, more than two chiral nematic liquid crystal materials may be used to produce a white light combined reflection band and that FIG. 1a shows only two for the sake of simplicity.

Figure 1B:
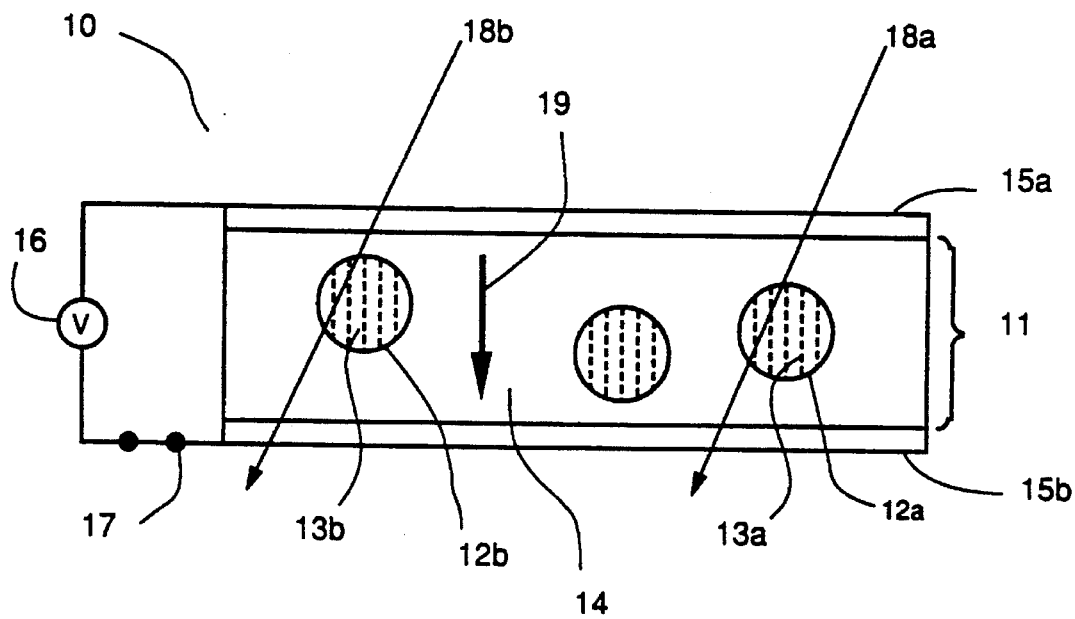

Because only the component light having circular polarization corresponding to the chirality of the helical axes is reflected, optionally one may combine droplets containing liquid crystal material of one chirality with droplets containing liquid crystal material of the opposite chirality (but the same helical pitch), to ensure that there is reflection of incident light within the reflection band regardless of its circular polarization. In the example of FIGS. 1a–b, the matrix polymer might contain droplets of four types liquid crystal material: that with right handed chirality and helical pitch $P_a$, that with left-hand chirality and helical pitch $P_a$, that with right-handed chirality and helical pitch $P_b$, and that with left-handed chirality and helical pitch $P_b$. The net effect is that more of the incident light is reflected, creating a more intensely white off-state appearance.

Another optional embodiment is to select liquid crystal materials 13a and 13b such that each has an extraordinary index of refraction $n_e$ which is different from and but an ordinary index of refraction $n_o$ which is the substantially the same as the index of refraction $n_p$ of the matrix polymer. Incident light travelling through composite 11 has a high statistical probability of encountering at least one interface between containment medium 14 and liquid crystal material 13a or 13b in which the liquid crystal index of refraction with which it operatively interacts is $n_e$. Since $n_e$ is different from the index of refraction n of the containment medium, there is refraction, or scattering of the light. To the extent that there is back-scattering, light is redirected towards the incident side. (Light which is forwardly scattered may still be redirected backwards by the reflection mechanism.) The net effect also is to increase the amount of light redirected back towards the incidence side of composite 11, again enhancing the intensity of the off-state white.

Figure 1C:
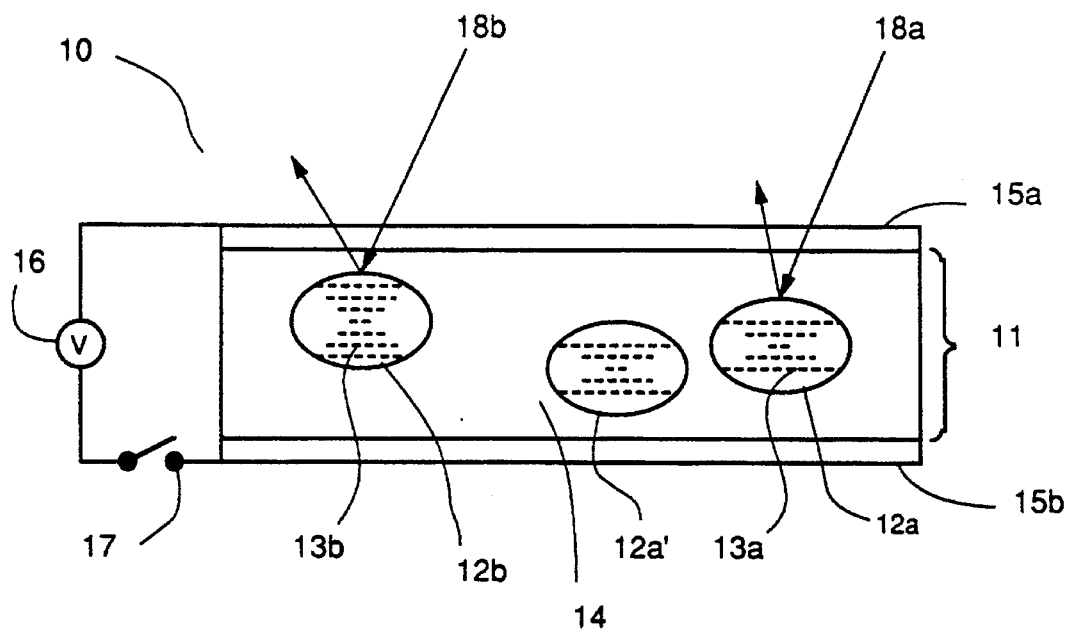
FIG. 1c shows a preferred embodiment, in the unpowered state.

In yet another preferred embodiment the helical planes are induced to parallel the light valve plane by flattening the droplets, as shown schematically in FIG. 1c. When the helical planes are parallel in this manner, increased back-reflection efficiency is attained, again leading to a more intensely white off-state.

FIG. 1b shows the optical effect when switch 17 is closed (the "on-state"). An electric field is applied between electrodes 15a and 15b and across composite 11, with a directionality indicated by arrow 19. Liquid crystal materials 13a and 13b, being positively dielectrically anisotropic, align parallel to the electric field direction. (The required voltage is dependent on the thickness of the composite and typically is between 3 and 50 volts.) Further, this alignment with the field occurs in each droplet 12a and 12b, so that there is order among the directors from droplet to droplet, as shown symbolically in FIG. 1b. When the liquid crystal molecules are aligned in this manner, the liquid crystal index of refraction with which incident light rays 18a and 18b operatively interact is $n_o$. Because $n_o$ is substantially the same as $n_p$, there is no scattering at the liquid crystal-containment medium interface. Because the helical structure of the chiral nematic mesophase has been destroyed by the realignment of the liquid crystal molecules, there also is no back-reflection of the incident light. As a result, ray 18 is transmitted through composite 11, which now appears transparent. Transmission rates of at least 50%, and preferably on the order of 70% or higher may be attained. (In the less preferred embodiment in which $n_o$ and $n_p$ are not matched, composite 11 would appear slightly hazy. For the purposes of this specification, such haziness does not mean that the composite is not "substantially transparent.")

The light valve of this invention is especially suitable for use in direct view reflective displays and projectors.

Figure 2:
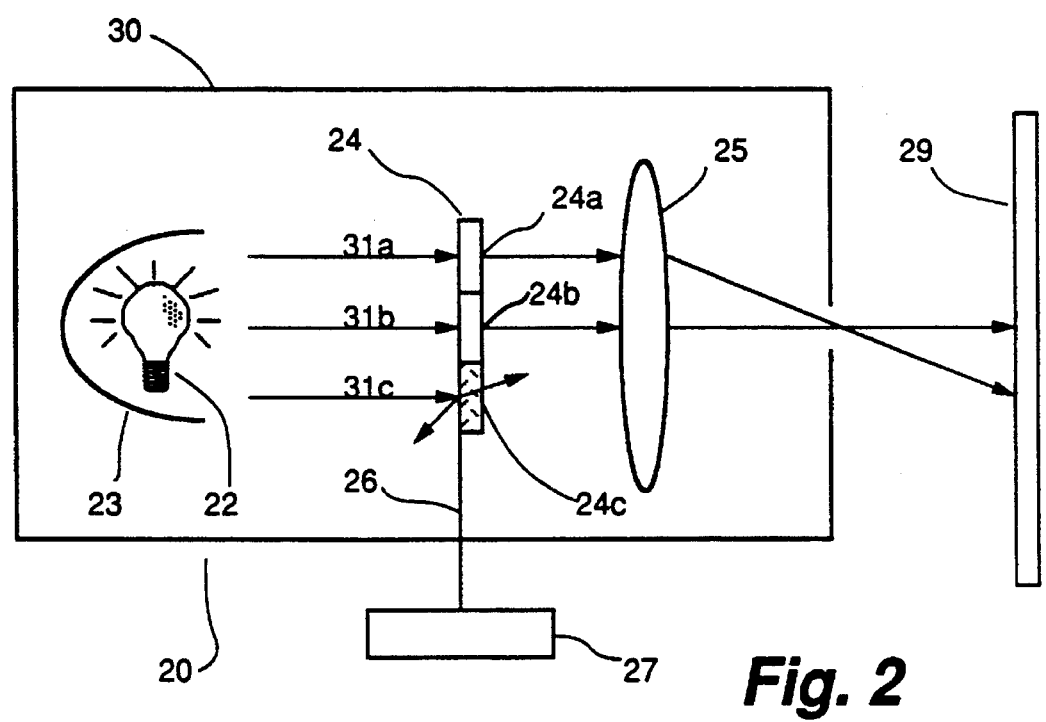
FIG. 2 shows a projector of this invention.

FIG. 2 is a schematic representation of a projector containing a light valve of this invention. Projector 20 has a light source 22 (for example a bulb or an arc lamp) and a parabolic reflector 23 for directing collimated light (rays 31a, 31b, and 31c) towards panel 24 comprising liquid crystal-polymer composite as described above. Alternatively or additionally, a lens (not shown) between light source 22 and panel 24 can be used for collimating and directing the light. Panel 24 comprises plural pixel elements, each of which may be switched between a reflecting and/or scattering off-state and a transmissive on-state, as discussed above. Control of which pixel elements of panel 24 are in the on- or off-state, in order to form an image, is effected by electric drive means 27 (such as a microcomputer), connected to panel 24 by connection 26. In the figure, pixel elements 24a and 24b are shown in the on-state while pixel element 24c is shown in the off-state. (Those skilled in the art will understand that in actuality the number of pixel elements will be much larger, with only three being shown here for simplicity of illustration.) Consequently, rays 31a and 31b are transmitted through panel 24, while ray 31c is backwards reflected and/or scattered (with a small amount of forward scattering). Rays 31a and 31b are focussed by lens 25 onto projection screen 29, where the viewing image is formed. Because there is little forwardly-scattered light, a large aperture lens 25 may be used without risking collecting much stray light, resulting in a brighter projector having high contrast.

Figure 3:
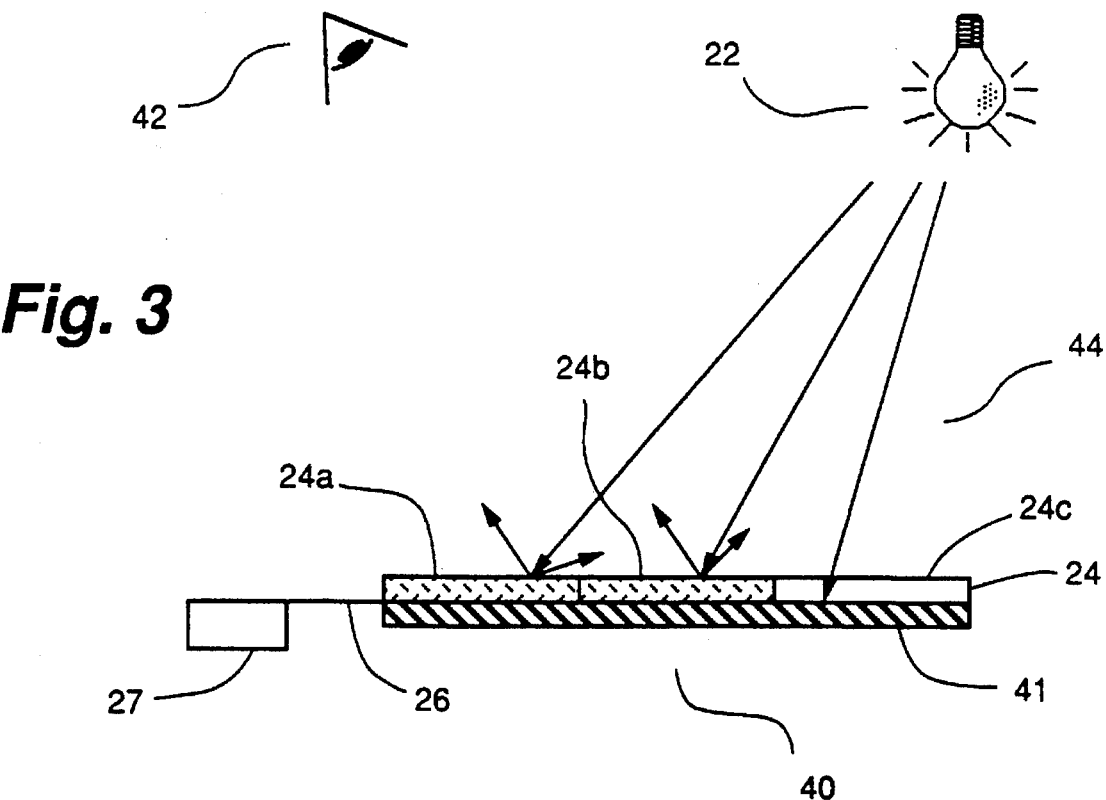
FIG. 3 shows a direct view display of this invention.

FIG. 3 (wherein numbers repeated from prior figures denote like elements) shows a direct view display 40 employing a light valve of this invention. In panel 24 pixels 24a and 24b are in the off-state, while pixel 24 is in the on-state. Light source 22 (which may be ambient room lighting or a desk lamp) produces light which is incident on display 40 from viewing side 44. This light is transmitted through pixel 24c and absorbed by a dark colored light absorber 41, such as a matt black painted surface or a bee's eye structure, so that pixel 24c appears dark to viewer 42. However, light incident on pixels 24a and 24b is strongly back-reflected and/or scattered, so that these pixels appears paper-white to viewer 42. Display 40 therefore presents a high contrast between paper white pixels in the off-state and dark (or colored) pixels in the on-state.

Reference is next made to two related prior art liquid crystal-polymer composites, so that those skilled in the art may more readily appreciate the comparative differences and advantages of the instant invention.

The first prior art composite is described in Fergason, U.S. Pat. No. 4,435,047. The composite comprises droplets of positive dielectric anisotropy nematic liquid crystals dispersed in a matrix polymer. The ordinary index of refraction $n_o$ of the nematic liquid crystals is matched to the index of refraction $n_p$ of the matrix polymer, while the extraordinary index of refraction $n_e$ is not. In the off-state, the orientation of the liquid crystals with respect to the viewing plane is random (within each droplet, the alignment is generally curvilinear due to surface interactions with the matrix polymer). There is scattering by the mechanism discussed above in relation to FIG. 1a, and the composite appears translucent or frosty. Almost all of the scattering is forward scattering, with only a small amount (about 5%) being back-scattering. In the on-state, the nematic liquid crystals align with the long molecular axes parallel to the electric field. Due to the match between $n_o$ and $n_p$, there is no scattering and incident light is transmitted. This composite can attain a high transmission in the on-state, but the off-state performance is inferior to that obtainable by a light valve according to this invention—the amount of back-scattered light being too small to create the strong paper-white appearance needed for superior contrast at low voltages.

The second prior art composite is described in Crooker et al., U.S. Pat. No. 5,200,845 (1993). This composite comprises droplets of chiral nematic liquid crystals having a negative dielectric anisotropy dispersed in a matrix polymer. In the off-state, the liquid crystal molecules are reported to be randomly aligned, causing scattering which in turn causes the composite to appear translucent and non-reflective. Because the dielectric anisotropy of the liquid crystals there is negative (unlike the positive dielectric anisotropy liquid crystals of the instant invention), in the on-state they align with the long molecular axes perpendicular to the field direction, in a planar texture. Incident light is thus reflected, causing the composite to appear colored. Thus, in neither the on-state nor the off-state does the Crooker composite achieve either of the visual states obtainable with the instant invention—a paper white state, or a highly transmissive state.

Returning now to the instant invention, when a chiral nematic liquid crystal material is in its planar (also called Grandjean) texture, the width $\Delta\lambda$ of the reflection band may be calculated as follows:

$$\Delta\lambda = \frac{\lambda \cdot \Delta n}{n}$$

where $\lambda$ is the center (or maximum) of the reflection band and is directly related to the helical pitch, $\Delta n$ is the birefringence (equalling $|n_o - n_e|$), and n is the index of refraction of the chiral nematic liquid crystal material. For n, one may used a weighted average of $n_o$ and $n_e$:

$$n = \frac{2n_o + n_e}{3}$$

For instance, for a chiral nematic liquid crystal material having a reflection band centered at 500 nm, a birefringence of 0.3 and an index of refraction of 1.5, the width of the reflection band is 100 nm. In a preferred embodiment, the liquid crystal composite comprises three populations of droplets of chiral nematic liquid crystal material: one having a reflection band in the red region of the visible spectrum, a second one having a reflection band in the green region of the visible spectrum, and a third having a reflection band in the blue region of the visible spectrum.

Chiral nematic liquid crystal materials (also referred to as cholesteric for historical reasons) may be made by the addition of a chiral additive to an otherwise ordinarily nematic liquid crystal material. This additive induces the liquid crystal molecules to arrange themselves in the helically twisted planar structure characteristic of this mesophase. Among the chiral additives are cholesteryl halides, which induce right-handed helices, and cholesteryl alkyl esters, which induce left-handed helices; sugar derivatives (commercially available from Merck under the trade names CE4 to CE7), which induce right-handed helices; and cyanobiphenyl derivatives (commercially available from Merck under the trade names C15 and CB15), which induce left- or right-handed helices, depending on the exact molecular structure of the additive. By selecting the appropriate chiral additive and the amount thereof in combination with the appropriate nematic liquid crystal, one may formulate chiral nematic liquid crystal materials having predetermined chirality and reflection bands.

While hitherto the invention has been described herein in terms of reflection bands in the visible region, it is to be understood that reflection in the infrared region is also contemplated. By controlling the amount of the chiral additive in the formulation, one may readily produce chiral nematic compositions which have pitches in the 1 to 10 µm range, capable of reflecting infra-red light. Such compositions may be used to make heat shutter films having good reflectivity.

The average diameter of the droplets preferably is between 0.5 and 10 µm, more preferably between 2 and 4 µm. The diameter of the droplets also preferably is at least several times the helical pitch, or else the helical structure may be distorted by surface forces.

The ordinary index of refraction $n_o$ is considered to be substantially the same as the index of refraction of $n_p$ of the matrix polymer when the difference between the two is less than 0.05, preferably less than 0.02.

A simple way of making the composites of this invention is to prepare an emulsion of a first chiral nematic liquid crystal material in the matrix polymer and then another emulsion of a second chiral nematic liquid crystal material in the matrix polymer and then mix the two emulsions. It has been observed that while the individual droplets become more or less homogeneously distributed within the combined emulsions, there is little or no migration of liquid crystal material from one droplet to another. The mixed emulsions are then spread onto a substrate (which may be a transparent electrode) and allowed to dry. Prior art techniques for the preparation nematic liquid crystal-polymer composites by an emulsion process are applicable here mutatis mutandis. Exemplary disclosures in this regard include Fergason, U.S. Pat. No. 4,435,047 (1984); Andrews et al., U.S. Pat. No. 5,202,063 (1993); and copending, commonly assigned application no. 08/105,658 of Reamey, filed Aug. 12, 1993; each of which is incorporated herein by reference. Alternatively, the droplets from the first emulsion may be isolated, for example by spinning them down in a centrifuge, and added to the second emulsion.

Suitable matrix polymers include but are not limited to gelatin, poly(vinyl alcohol), polyurethane, poly(ethylene oxide), poly(vinyl pyrrolidone), cellulosic polymers, natural gums, acrylic and methacrylic polymers and copolymers, epoxies, polyolefins, vinyl polymers, and the like. Polyurethane latexes, such as described in Pearlman, U.S. Pat. No. 4,992,201 (1991), the disclosure of which is incorporated herein by reference, may also be used.

Displays of this invention may be directly driven or may have an active matrix drive, in which each pixel is driven (i.e., switched from one visual state to another) by an active switching element such as a thin film transistor ("TFT"), varistor, diode, or MIM. The switching element helps eliminate crosstalk and maintain an initially applied voltage across the corresponding pixel, even when it is not being actively addressed, so that the pixel stays "on" while other pixels are addressed. The longer the pixels holds the initially applied voltage, the longer it can be maintained in the "on" state until it is next addressed, permitting the construction of displays having a larger number of pixels. If the matrix contains a sufficiently large number of switching elements of sufficiently small size, high resolution displays are possible. Active matrix displays are important for television, computer, and instrument screens. Active matrix displays employing liquid crystal composites are disclosed in Becker et al., U.S. Pat. No. 5,153,554 (1993), and Kamath et al., U.S. Pat. No. 5,233,445 (1993), the disclosures of which are incorporated herein by reference.

EXAMPLE

Chiral nematic liquid crystal materials A and B, each having a positive dielectric anisotropy, were made:

A: 38% CB15 (Merck Gmbh, Germany) and 62% RYC1011 (Chisso Corporation, Japan), which was red-orange reflecting.

B: 49% CB15 and 51% RYC1011, which was blue reflecting.

These were independently emulsified in 10% solutions of Vynol 205™ poly(vinyl alcohol) to a means droplet size of about 3 µm. The ratio of poly(vinyl alcohol) to liquid crystal material was 83:12 w:w. Equal amounts of the two emulsions were combined, coated onto ITO coated glass, dried, and laminated to another sheet of ITO coated glass to form an electro-optic cell (referred to as Cell I). As controls, reference cells II and III were similarly prepared from each of the emulsions of liquid crystal materials A and B. Results are provided in Table I below:

| Cell | Liquid Crystal Material | Thickness (µm) | Reflective Color |
| --- | --- | --- | --- |
| I | A and B | 10.1 | White |
| II | A only (control) | 7.2 | Pale brown/orange |
| III | B only (control) | 8.8 | Pale green/blue |

The foregoing detailed description of the invention includes passages which are chiefly or exclusively concerned with particular parts or aspects of the invention. It is to be understood that this is for clarity and convenience, that a particular feature may be relevant in more than just passage in which it is disclosed, and that the disclosure herein includes all the appropriate combinations of information found in the different passages. Similarly, although the various figures and descriptions thereof relate to specific embodiments of the invention, it is to be understood that where a specific feature is disclosed in the context of a particular figure, such feature can also be used, to the extent appropriate, in the context of another figure, in combination with another feature, or in the invention in general.

What is claimed is:

1. A liquid crystal-polymer composite, comprising a matrix polymer;

plural volumes of a first liquid crystal material dispersed in the matrix polymer, which first liquid crystal material is chiral nematic and positively dielectrically anisotropic and has a characteristic reflection band; and plural volumes of at least one additional liquid crystal material also dispersed in the matrix polymer, which at least one additional liquid crystal material also is chiral nematic and positively dielectrically anisotropic but has a characteristic reflection band different from the characteristic reflection band of the first liquid crystal material;

which composite at least one of reflects and scatters incident light in the absence of a sufficient electric field and is substantially transparent to incident light in the presence of a sufficient electric field.

2. A liquid crystal-polymer composite according to claim 1, wherein the ordinary indices of refraction $n_o$ of the first and the at least one additional liquid crystal materials are substantially the same as the index of refraction $n_p$ of the matrix polymer.

3. A liquid crystal-polymer composite according to claim 1, wherein the combined reflection bands of the first and the at least one additional liquid crystal materials cause the liquid crystal-polymer composite to have a combined reflection band between 400 and 700 nm.

4. A liquid crystal-polymer composite according to claim 1, wherein the at least one additional liquid crystal material is two in number and wherein the first liquid crystal material has a reflection band in the red region of the visible spectrum, one of the two additional liquid crystal materials has a reflection band in the green region of the visible spectrum, and the other additional liquid crystal material has a reflection band in the blue region of the visible spectrum.

5. A liquid crystal-polymer composite according to claim 1, wherein the plural volumes of the first and the at least one additional liquid crystal material each comprise volumes of liquid crystal material of right-handed chirality and volumes of liquid crystal material of left-handed chirality.

6. A liquid crystal light valve, comprising (a) spaced-apart first and second transparent electrodes and (b) a liquid crystal-polymer composite disposed between the first and second electrodes, the composite comprising a matrix polymer;

plural volumes of a first liquid crystal material dispersed in the matrix polymer, which first liquid crystal material is chiral nematic and positively dielectrically anisotropic and has a characteristic reflection band; and plural volumes of at least one additional liquid crystal material also dispersed in the matrix polymer, which at least one additional liquid crystal material also is chiral nematic and positively dielectrically anisotropic but has a characteristic reflection band different from the characteristic reflection band of the first liquid crystal material;

which composite at least one of reflects and scatters incident light in the absence of a sufficient electric field and is substantially transparent to incident light in the presence of a sufficient electric field.

7. A light valve according to claim 6, wherein, in the liquid crystal-polymer composite, the at least one additional liquid crystal material is two in number, and further wherein the first liquid crystal material has a reflection band in the red region of the visible spectrum, one of the two additional liquid crystal materials has a reflection band in the green region of the visible spectrum, and the other additional liquid crystal material has a reflection band in the blue region of the visible spectrum.

8. A light valve according to claim 6, wherein, in the liquid crystal-polymer composite, the plural volumes of the first and the at least one additional liquid crystal material each comprise volumes of liquid crystal material of right-handed chirality and volumes of liquid crystal material of left-handed chirality.

9. A light valve according to claim 6, wherein, in the liquid crystal-polymer composite, the ordinary indices of refraction $n_o$ of the first and the at least one additional liquid crystal materials are substantially the same as the index of refraction $n_p$ of the matrix polymer.

10. A light valve according to claim 6, wherein, in the liquid crystal-polymer composite, the combined reflection bands of the first and the at least one additional liquid crystal materials cause the liquid crystal-polymer composite to have a combined reflection band between 400 and 700 nm.

11. A projector, comprising (a) a light source for producing light;

(b) a lens for projecting the light onto a screen; and (c) liquid crystal-polymer composite disposed between the light source and the lens for controlling which portions of the light reach the lens, the liquid crystal-polymer composite comprising a matrix polymer;

plural volumes of a first liquid crystal material dispersed in the matrix polymer, which first liquid crystal material is chiral nematic and positively dielectrically anisotropic and has a characteristic reflection band; and plural volumes of at least one additional liquid crystal material also dispersed in the matrix polymer, which at least one additional liquid crystal material also is chiral nematic and positively dielectrically anisotropic but has a characteristic reflection band different from the characteristic reflection band of the first liquid crystal material;

which composite at least one of reflects and scatters incident light in the absence of a sufficient electric field and is substantially transparent to incident light in the presence of a sufficient electric field.

12. A projector according to claim 11, wherein, in the liquid crystal-polymer composite, the plural volumes of the first and the at least one additional liquid crystal material each comprise volumes of liquid crystal material of right-handed chirality and volumes of liquid crystal material of left-handed chirality.

13. A projector according to claim 11, wherein, in the liquid crystal-polymer composite, the ordinary indices of refraction $n_o$ of the first and the at least one additional liquid crystal materials are substantially the same as the index of refraction $n_p$ of the matrix polymer.

14. A projector according to claim 11, wherein, in the liquid crystal-polymer composite, the combined reflection bands of the first and the at least one additional liquid crystal materials cause the liquid crystal-polymer composite to have a combined reflection band between 400 and 700 nm.

15. A projector according to claim 11, wherein, in the liquid crystal-polymer composite, the at least one additional liquid crystal material is two in number, and further wherein the first liquid crystal material has a reflection band in the red region of the visible spectrum, one of the two additional liquid crystal materials has a reflection band in the green region of the visible spectrum, and the other additional liquid crystal material has a reflection band in the blue region of the visible spectrum.

16. A display, comprising (a) a light absorber and (b) liquid crystal-polymer composite disposed on a viewing side of the display and between the light absorber and light incident on the display from the viewing side, which composite controls whether such incident light reaches the light absorber and is absorbed thereby or is at least one of reflected or scattered back towards the viewing side and comprises a matrix polymer;

plural volumes of a first liquid crystal material dispersed in the matrix polymer, which first liquid crystal material is chiral nematic and positively dielectrically anisotropic and has a characteristic reflection band; and plural volumes of at least one additional liquid crystal material also dispersed in the matrix polymer, which at least one additional liquid crystal material also is chiral nematic and positively dielectrically anisotropic but has a characteristic reflection band different from the characteristic reflection band of the first liquid crystal material;

which composite at least one of reflects and scatters incident light in the absence of a sufficient electric field and is substantially transparent to incident light in the presence of a sufficient electric field.

17. A display according to claim 16, wherein, in the liquid crystal-polymer composite, the ordinary indices of refraction $n_o$ of the first and the at least one additional liquid crystal materials are substantially the same as the index of refraction $n_p$ of the matrix polymer.

18. A display according to claim 16, wherein, in the liquid crystal-polymer composite, the combined reflection bands of the first and the at least one additional liquid crystal materials cause the liquid crystal-polymer composite to have a combined reflection band between 400 and 700 nm.

19. A display according to claim 16, wherein, in the liquid crystal-polymer composite, the at least one additional liquid crystal material is two in number, and further wherein the first liquid crystal material has a reflection band in the red region of the visible spectrum, one of the two additional liquid crystal materials has a reflection band in the green region of the visible spectrum, and the other additional liquid crystal material has a reflection band in the blue region of the visible spectrum.

20. A display according to claim 16, wherein, in the liquid crystal-polymer composite, the plural volumes of the first and the at least one additional liquid crystal material each comprise volumes of liquid crystal material of right-handed chirality and volumes of liquid crystal material of left-handed chirality.

* * * * *